Nov. 1, 1932.  W. J. ROBINSON  1,885,377
WEEDING IMPLEMENT
Filed May 13, 1931
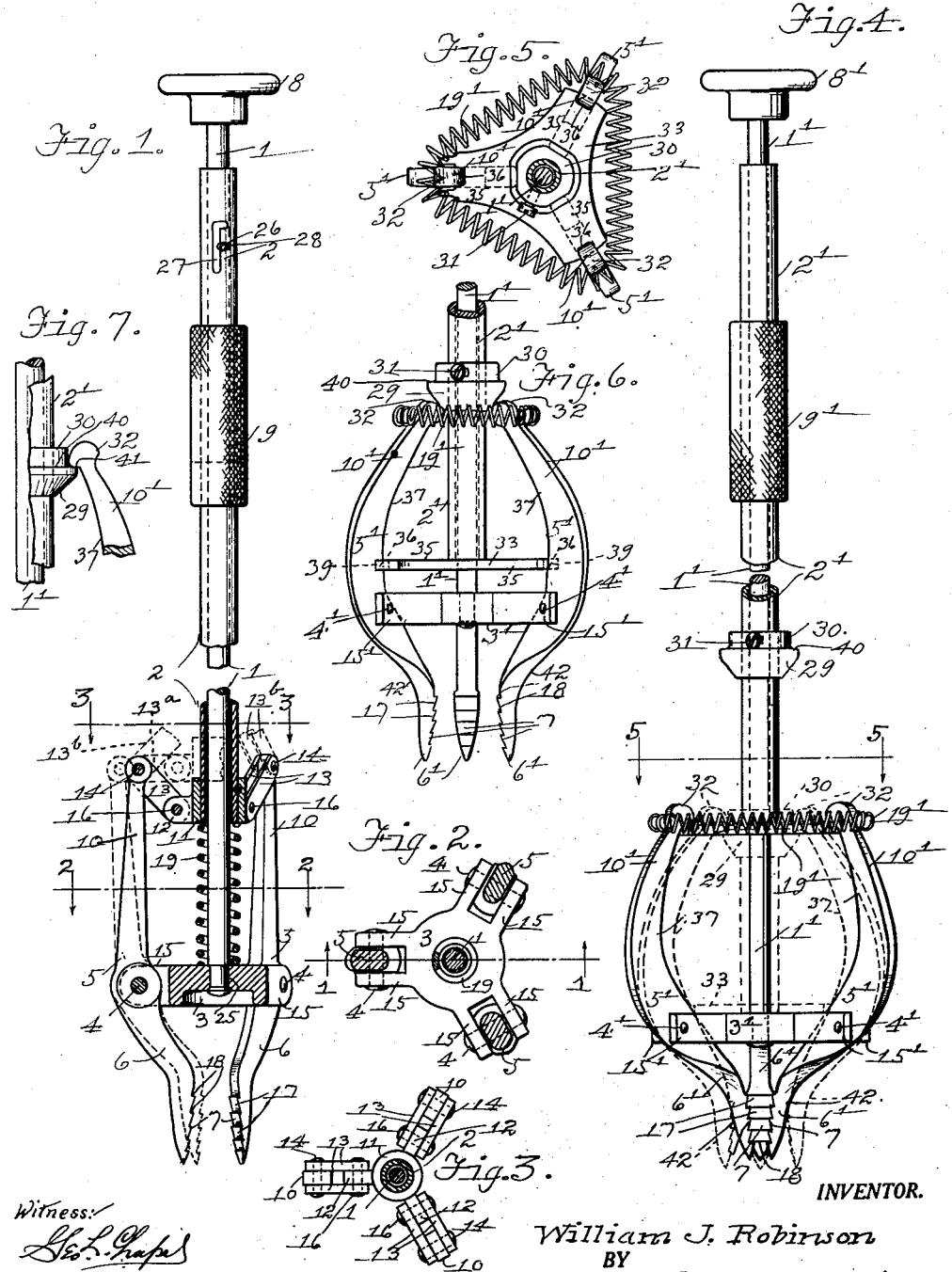
INVENTOR.
William J. Robinson
BY
Rice and Rice
ATTORNEYS.

Patented Nov. 1, 1932

1,885,377

UNITED STATES PATENT OFFICE

WILLIAM J. ROBINSON, OF MUSKEGON, MICHIGAN

WEEDING IMPLEMENT

Application filed May 13, 1931. Serial No. 536,958.

The present invention relates to implements for extracting the roots of weeds and the like; and its object is to provide an improved implement of this character having elongated operating members connected slidably, root-gripping jaws fulcrumed on one of said members, and means for operating the jaws by the interrelative movement of said members; and further, to provide such means thus movable in one or both directions positively and also yieldingly; and further, to provide improved connections or operating parts intermediate said members and the jaws for effecting the operation thereof.

These and any other and more specific objects hereinafter appearing are attained by, and the invention finds preferable embodiment in, the implement particularly described in the body of this specification and illustrated by the accompanying drawing, in which:

Figure 1 is an elevational view of a root-extracting implement, partially sectioned on line 1—1 of Figure 2;

Figure 2 is a transverse sectional view thereof taken on line 2—2 of Figure 1;

Figure 3 is a transverse sectional view of the same taken on line 3—3 of Figure 1;

Figure 4 is an elevational view of a modified construction of the implement;

Figure 5 is a transverse sectional view thereof taken on line 5—5 of Figure 4;

Figure 6 is an elevational view of the lower portion of the same showing the parts in another position; and Figure 7 is a detail fragmentary view of certain parts of the same showing said parts in the position seen in Figure 4.

In this drawing is shown an implement for extracting the roots of weeds and the like, comprising a pair of members connected longitudinally-slidably, one of these members having pivoted thereon a plurality of cooperating levers with root-gripping jaws, means intermediate the other one of said members and the levers being provided for operating the levers by the relatively sliding movement of said members.

Somewhat different forms or modified constructions of this implement are illustrated by the drawing, one form being shown in Figures 1, 2 and 3 and the other form in Figures 4, 5, 6 and 7, corresponding parts in the two forms being indicated by the same reference numerals, such parts in Figures 4, 5, 6 and 7 having the prime mark applied to such numerals.

The elongated members 1, 2 or $1^1$, $2^1$ are telescopically arranged in slidable relation, the rod inner member 1 or $1^1$ having at its lower end a head 3 or $3^1$ between whose pairs of ears 15 or $15^1$ angularly spaced about the axis of said members are fulcrumed at 4 or $4^1$ a plurality—desirably three as shown—of cooperating levers 5 or $5^1$ having pointed lower arms or jaws 6 or $6^1$ adapted to be thrust into the earth and to grip the root between them, their inner edges being serrated to form ratchet teeth 7 having inclined lower sides 17 and abrupt upper sides 18 for more effectually engaging the roots. The inner member 1 or $1^1$ has a handle upper portion 8 or $8^1$ and the hollow member 2 or $2^1$ has the handle portion 9 or $9^1$.

In either illustrated form of the implement the upper arms 10 or $10^1$ of said levers are moved by the interrelative movement of said telescoping members to grip the root in the ground and to release the same when extracted.

In the form of the implement illustrated in Figures 1, 2 and 3 the hollow member 2 has at its lower end a head 11 on whose angularly spaced ears 12 the pairs of links 13 are pivoted at 16, the other ends of these links being pivoted at 14 on the levers' upper arms 10. In this form (shown in Figures 1, 2 and 3) the jaws 6 have (as shown in solid lines in Figure 1) been spread farthest apart by the movement of the handles 8, 9 away from each other. These handle may be thus relatively moved by the operator's hands grasping the same, or by resting the extremities of the jaws on some fairly solid surface and moving the hollow member's handle 9 downwardly.

The rod member 1 may now be turned relatively to its head 3 about the swivel connection 25 therewith to cause said rod's stop pin 26 (slidable in the slot 27 of the hollow member 2) to enter a notch 28 and thus releasably hold said members 1, 2 in this position to which they have been thus slidably moved. The links 13 are now in the inclined solid line position seen in Figure 1. The operator thrusts the jaws 6 into the earth around the root, by grasping the handle 8 or 9.

Turning these handles and the members 1 and 2 thus reversely releases the stop pin from the notch and permits the spring 19, coiled around member 1, to expand pressing the head 11 upwardly and the links to dotted line horizontal position 13ª thus causing the jaws 6 to converge and grip the root between them.

After withdrawing the implement and the extracted root from the earth, the spring 19 presses the hollow member 2 farther upwardly and the links to their upper dotted line position 13ᵇ, thus again moving the jaws 6 from each other. By moving the handles 8, 9 toward and from each other the extracted root is disengaged from the jaws.

In the form of the implement shown in Figures 4, 5, 6 and 7, the operation of the parts is similar to that of corresponding parts shown in the other views. The arms 35 of the triangular plate 33 carried on the lower end of hollow member 2¹ have guide grooves 36 in their ends in which the upper arms 10¹ of the levers slide, these arms' inner edges forming cams 37 bearing in said grooves.

When the hollow member 2¹ is slid downwardly from the position shown in Figure 6 (in which the plate 33 is at the low point 39 of the cams), the inwardly-downwardly inclined face 29 of a collar 30 (slidable on the hollow member 2¹ to adjusted positions in which it is fixed by a set screw 31) bears on the upper ends 32 of the levers' arms 10¹ and, moving the same apart against the pressure of a surrounding spring 19¹, positively moves the jaws 6¹ toward each other and the parts to the positions indicated in dotted lines in Figure 4.

The jaws 6¹ are now in properly separated position to be thrust into the earth around the root. Such thrusting action moves (against the pressure of spring 19¹) the jaws toward each other by the camming action of the earth on the jaws' outer edges 42, the jaws thus assuming the position shown in solid lines in Figure 4 and gripping the root between them.

When the implement with the gripped root is withdrawn from the earth, the hollow member 2¹ is slid upwardly carrying the collar 30 above the upper ends 32 of the lever arms 10¹ thus permitting the spring 19¹ to contract and separate the jaws (as seen in Figure 6) to release the extracted root; and the upward movement of this hollow member continuing till the plate 33 passes above the cams' low point 39, said plate positively forces the arms 10¹ apart, so that by this back and forth movement of the hollow member relatively to the rod member 1¹ the root is dislodged and entirely released from the jaws. In the position of the parts seen in Figure 7 and in dotted lines in Figure 4 the shoulders 41 of the arms 10¹ rest on the ledge 40 of the collar 30.

The invention being intended to be pointed out in the claims, is not to be limited to or by details of construction of any particular embodiment thereof illustrated by the drawing or hereinbefore described.

I claim:

1. In an implement of the character described: a pair of relatively movable telescoping members; a plurality of levers fulcrumed in angularly spaced relation on the inner one of said members, their lower arms forming gripping jaws; a collar on the outer one of said members having a face inclined from the axis of said members bearing on the upper arms of the levers to positively move the same by the relative movement of said members; a spring surrounding the upper arms of the levers and urging the same toward each other.

2. In an implement of the character described: a pair of relatively movable telescoping members; a plurality of levers fulcrumed in angularly spaced relation on the inner one of said members, their lower arms forming gripping jaws and their upper arms having shoulders; a collar on the outer one of said members having a ledge and a face inclined from the axis of said members bearing on the upper arms of the levers to positively move the same by the relative movement of said members, said shoulders resting on said ledge in one relative position of said members.

3. In an implement of the character described: a pair of relatively movable telescoping members; a plurality of levers fulcrumed in angularly spaced relation on the inner one of said members, their lower arms forming gripping jaws and their upper arms having shoulders; a collar on the outer one of said members having a ledge and a face inclined from the axis of said members bearing on the upper arms of the levers to positively move the same by the relative movement of said members, said shoulders resting on said ledge in one relative position of said members; a spring pressing said shoulders in resting position on said ledge.

4. In an implement of the character described: a pair of relatively movable telescoping members; a plurality of levers fulcrumed in angularly spaced relation on the inner one of said members, their lower arms forming gripping jaws and their upper arms having cams; a cross plate carried by the outer one of said members and bearing on the cams respectively for positively moving said upper arms from each other by the relative movement of said members.

5. In an implement of the character described: a pair of relatively movable telescoping members; a plurality of levers fulcrumed in angularly spaced relation on the inner one of said members, their lower arms forming gripping jaws and their upper arms having cams; a cross plate carried by the outer one of said members and bearing on the cams respectively for positively moving the said upper arms from each other by the relative movements of said members; a spring engaging said upper arms and urging the same toward each other.

6. In an implement of the character described: a pair of relatively movable telescoping members; a plurality of levers fulcrumed in angularly spaced relation on the inner one of said members, their lower arms forming gripping jaws and their upper arms having cams; a cross plate carried by the outer one of said members and bearing on the cams respectively for positively moving said upper arms from each other by the relative movements of said members in one direction; a collar on the outer one of said members having a face inclined from the axis of said members bearing on the upper arms of the levers to positively move the same from each other by the relative movement of said members in the opposite direction.

7. In an implement of the character described: a pair of relatively movable telescoping members; a plurality of levers fulcrumed in angularly spaced relation on the inner one of said members, their lower arms forming gripping jaws and their upper arms having cams; a cross plate carried by the outer one of said members and bearing on the cams respectively for positively moving said upper arms from each other by the relative movements of said members in one direction; a collar on the outer one of said members having a face inclined from the axis of said members bearing on the upper arms of the levers to positively move the same from each other by the relative movement of said members in the opposite direction, the outer edges of the gripping jaws being inclined downwardly-inwardly forming cams whereby said jaws are moved toward each other by being thrust into the earth.

8. In an implement of the character described: a pair of relatively movable telescoping members; a plurality of levers fulcrumed in angularly spaced relation on the inner one of said members, their lower arms forming gripping jaws and their upper arms having cams; a cross plate carried by the outer one of said members and bearing on the cams respectively for positively moving said upper arms from each other by the relative movements of said members in one direction; a collar on the outer one of said members having a face inclined from the axis of said members bearing on the upper arms of the levers to positively move the same from each other by the relative movement of said members in the opposite direction; a spring urging said upper arms toward each other, the outer edges of the gripping jaws being inclined downwardly-inwardly forming cams whereby said jaws are moved toward each other by being thrust into the earth.

In testimony whereof I have hereunto set my hand at Muskegon, Michigan, this 24th day of April, 1931.

WILLIAM J. ROBINSON.